United States Patent [19]

Abe

[11] 4,217,793
[45] Aug. 19, 1980

[54] RACK AND PINION TYPE STEERING GEAR

[75] Inventor: Michio Abe, Kasugai, Japan

[73] Assignee: Tokai TRW & Co., Ltd., Aichi, Japan

[21] Appl. No.: 917,510

[22] Filed: Jun. 21, 1978

[30] Foreign Application Priority Data

Apr. 24, 1978 [JP] Japan .................................. 53-48427

[51] Int. Cl.² ........................... B62D 1/20; F16H 1/16
[52] U.S. Cl. ..................................... 74/499; 74/89.14; 74/89.15; 74/425.5; 74/500
[58] Field of Search ................. 74/422, 498, 499, 500, 74/89.14, 89.15, 425.5

[56] References Cited

U.S. PATENT DOCUMENTS 1,760,733  5/1930  Barnhart ............................... 74/499

FOREIGN PATENT DOCUMENTS 614654   9/1926  France ....................................... 74/499
1356172  6/1974  United Kingdom .
1468691  3/1977  United Kingdom .
1479314  7/1977  United Kingdom .

Primary Examiner—C. J. Husar
Assistant Examiner—Conrad Berman
Attorney, Agent, or Firm—James E. Nilles

[57] ABSTRACT

This invention pertains to a rack and pinion type steering gear for an automobile comprising a housing; a pinion rotatably supported in said housing to receive turning effect from a steering wheel of the automobile; and a rack meshed with the pinion and slidably supported in the housing, the rack being connected to a tie rod which is in turn connected to the front wheels of the automobile. The pinion comprises first and second pinion portions rotatable separately from each other and having spiral gear teeth provided reversely to each other, respectively, the first pinion portion being connected to the steering wheel and the second pinion portion being meshed with the rack. The steering gear further comprises reduction or steering ratio variable means including a variable steering ratio sleeve rotatably and axially slidably supported in the housing, having a spiral internal gear meshed with the first pinion portion and being connected to the second pinion portion so as to transmit the turning effect to the second pinion portion, and variable sleeve spiral motion means provided between the engaging surfaces of the housing and the variable sleeve and having a guide groove of variable lead angle and a pin engaged with the guide groove.

7 Claims, 5 Drawing Figures

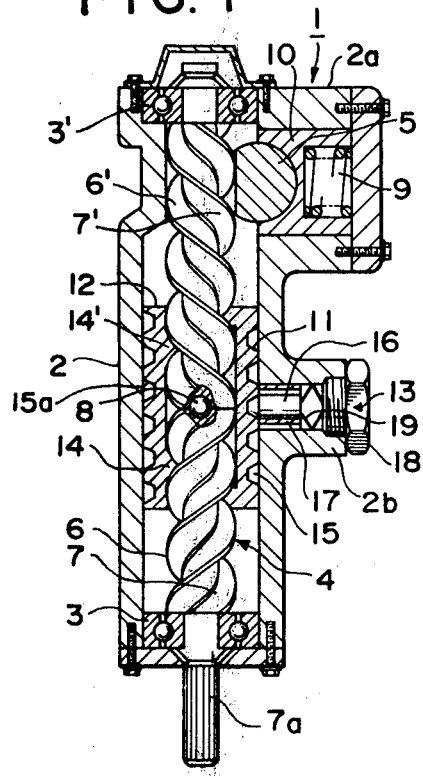

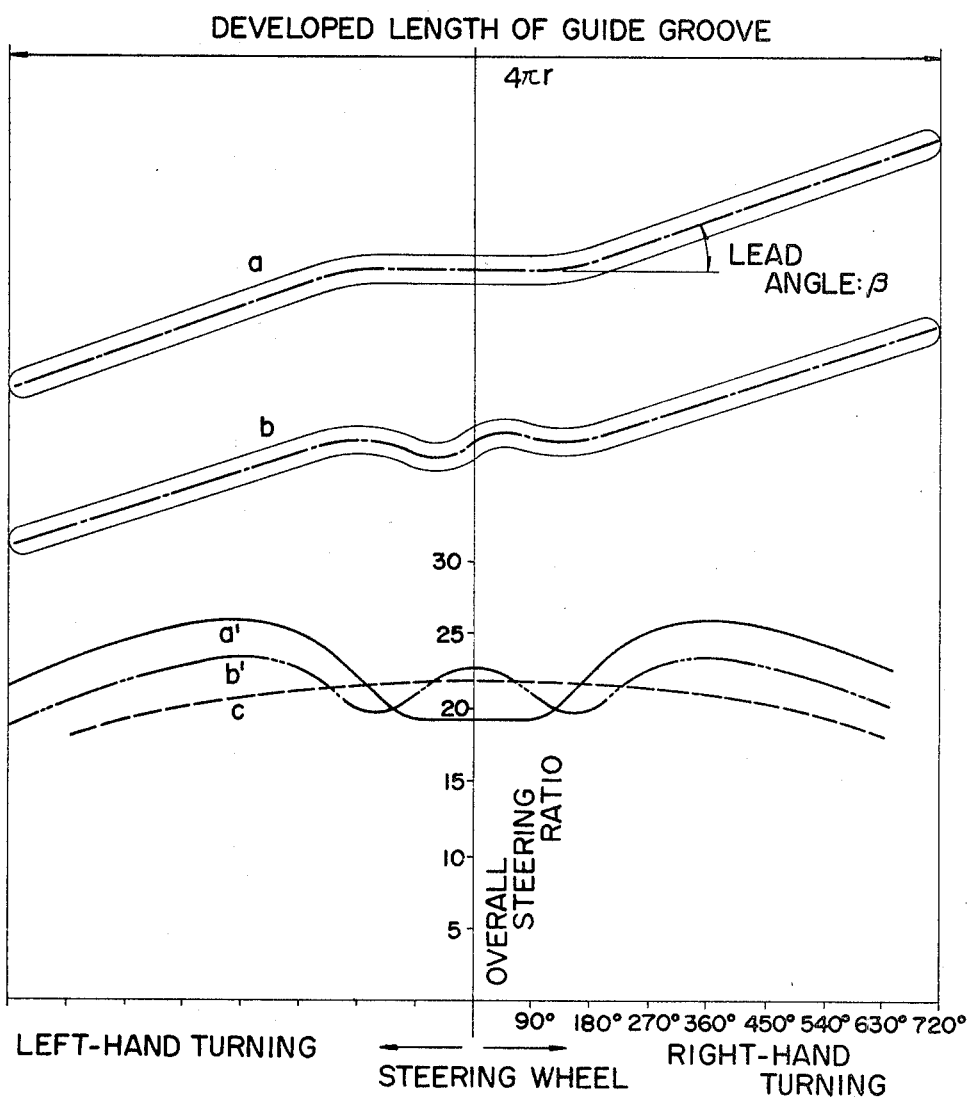

RACK AND PINION TYPE STEERING GEAR

BACKGROUND OF THE INVENTION

The rack and pinion type steering gear has been employed for the steering system of an automobile because of its lightness and its compactness. An automobile with front engine and front driving system is lighter because no long drive shaft is used, and accordingly, for the steering system, a light and small-sized rack and pinion type steering gear is employed. However, in this type steering gear, the rack is meshed with the pinion in a completely reversible manner, and therefore, a reaction force from a road surface is disadvantageously transmitted directly to the steering wheel. The overall steering ratio (the ratio of the wheels to the steering wheel) is usually 18 to 21 for a small automobile and 23 to 26 for a large automobile. If the steering ratio is so variable, that it is 18 to 21 at the neutral position of the steering wheel, or near its turning position from the netural position at slight angle in both directions and is 25 to 27 at the turning position of 200° to 360° of the steering wheel, then the rack and pinion type steering gear can be employed for an automobile having a displacement of 3,000 to 4,000 cc. If the steering gear has such a variable steering ratio, then light steering operation can be effected against the turning reaction force so as to keep the steering wheel proper, improve its stability and obtain a proper feeling of impact from the wheels.

In respect to the prior art rack and pinion type steering gear having a variable steering ratio, there is issued British Pat. No. 1,356,172 in which a rack has a pressure angle varied so as to vary the engaging pitch of the rack with the pinion; also, there are British Pat. Nos. 1,468,691 and 1,479,314 in which an intermediate gear is combined with a cam mechanism so as to vary the steering ratio of the steering gear. In the former patent, however, extremely difficult techniques and work are required to form a complicated tooth configuration corresponding to the varied pitch and pressure angle of the rack and the increasing overall steering ratio obtained by such a design is only 10 to 15 percent. In the latter patents, because more gears and the addition of a cam mechanism are required, the number of parts increases, which causes the construction to become complicated, and the volume of the gear increases.

SUMMARY OF THE INVENTION

Accordingly, it is a principal object of the invention to provide a rack and pinion type steering gear with a variable steering ratio which is easy to manufacture and is compact, so that the steering operation is easy.

It is another object of the invention to provide a rack and pinion type steering gear in which impact of ground on wheels is never transmitted directly to the steering wheel.

In accordance with the invention, there is provided a rack and pinion type steering system for an automobile comprising a housing; a pinion rotatably supported in said housing to receive turning effort from a steering wheel of said automobile; and a rack meshed with said pinion and slidably supported in said housing, said rack being connected to a tie rod which is in turn connected to the front wheels of said automobile. The invention is characterized in that said pinion comprises first and second pinion portions rotatable separately from each other and threaded reversely to each other, respectively, said first pinion portion being connected to said steering wheel and said second pinion portion being meshed with said rack. The invention further comprises variable steering ratio means including a variable steering sleeve rotatably and axially slidably supported in said housing, having a spiral internal gear meashed with said first pinion portion and being connected to said second pinion portion so as to transmit said turning effort to said second pinion portion. Variable sleeve spiral motion means are provided between the engaging surfaces of said housing and said variable sleeve and have a guide groove of variable lead angle and a pin engaged with said guide groove.

BRIEF DESCRIPTION OF THE DRAWINGS

The above and other objects and features of the invention will be understood with reference to the accompanying drawing in which;

FIG. 1 is a vertically sectional view of a rack and pinion type steering gear constructed in accordance with the invention;

FIG. 2 is a front view of a variable steering ratio sleeve used in the gear of the invention, with a half portion taken in vertical section;

FIG. 3 illustrates an angular movement of the first and second pinion portions;

FIG. 4 is a graph illustrating the relation of an overall steering ratio to the developed guide groove of the variable sleeve spiral motion means.

DETAILED DESCRIPTION OF PREFERRED EMBODIMENTS

Figure 5:
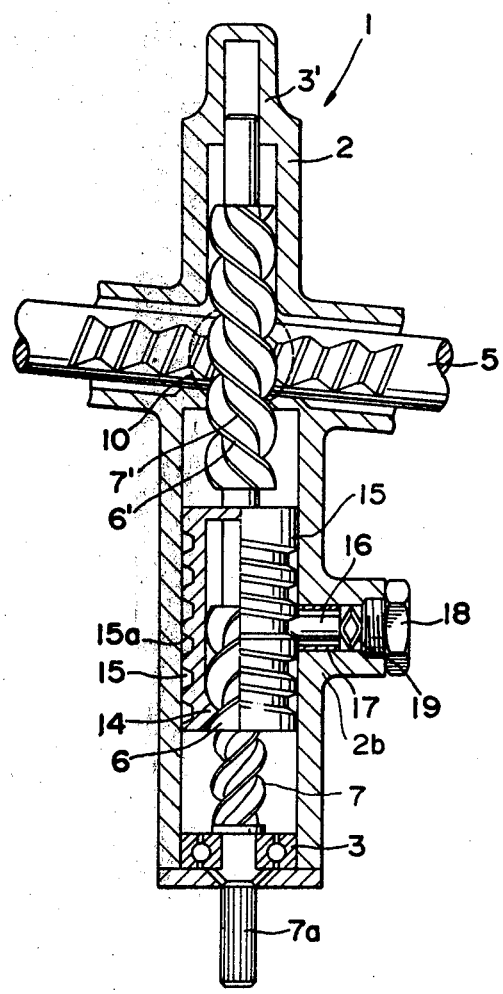
FIG. 5 is a vertically cross sectional view of another embodiment of the invention.

FIG. 1 shows a rack and pinion type steering gear 1 constructed in accordance with the invention. This gear comprises a substantially cylindrical housing 2, a pinion 4 rotatably supported on bearings 3 and 3' in the housing 2, and a rack 5 slidably supported in the housing to mesh with the pinion 4.

The pinion 4 comprises first and second pinion portions 7 and 7' threaded reversely to each other. The first pinion portion 7 may have a knurled portion 7a which protrudes out of the bearing 3 and to which the steering rod of the steering wheel is connected. The rack 5 is meshed with the second pinion portion 7'. Since the facing ends of the first and second pinion portions 7 and 7' have a difference in rotation for the reason described hereinafter and are frictionally engaged with each other, they are preferably engaged through ball engaging means 8 as shown to be rotated individually of each other.

As shown in FIG. 1, the rack 5 may be engaged with a pressurizing member 10 which is in turn engaged with a pressurizing spring 9 held within a protruded portion 2a of the housing 2 so as to apply a pressure to the rack radially of the second pinion portion 7'. As a result, the rack 5 may be positively meshed with the second pinion portion 7'.

The gear 1 of the invention further comprises variable reduction or steering ratio means 11 adapted to transfer turning effect from the first pinion portion 7 to the second pinion portion 7' at a variable revolution ratio. The variable steering ratio means 11 comprises a variable steering ratio sleeve 12 which is rotatably and axially slidably supported in the housing 2 and engaged with both of the first and second pinion portions 7 and 7', and variable sleeve spiral motion means 12 which serves to axially move the variable sleeve 12 by its spiral motion.

The variable steering ratio sleeve 12 has internal gears 14 and 14' meshed with the spiral teeth 6 and 6' of the first and second pinion portions 7 and 7', respectively, as shown in FIG. 2. As a result, if the variable sleeve 12 is locked in its axial direction, it connects the first and second pinion portions 7 and 7' so as to rotate them at the same angle.

The sleeve spiral motion means 13 is provided between the engaging surfaces of the housing 2 and the variable sleeve 12, and, in the illustrated embodiment, may comprise a guide groove 15 in the outer periphery of the variable sleeve 12 and a pin 16 mounted on the inner periphery of the housing 2 to be engaged with the guide groove 15 in the variable sleeve 12. The pin 16 may be rotatably supported by a needle bearing 17 in a protruding portion 2b of the housing 2, and forced against the wall of the guide groove 15 by a leaf spring 19 which is in turn compressed by a screw cap 18 on the protruding portion 2b.

The guide groove has the lead angle of 0° at its middle portion as indicated at a curve a of FIGS. 2 and 4, and of $\beta°$ at the other portions. Thus, it has a variable lead angle. The groove portion 15a of the lead angle of 0° extends over the angle corresponding to the neutral position of the steering wheel and the turning position of the steering wheel from the neutral position at a slight angle in both directions, as described later. As indicated at the curve a of FIG. 4, it will be noted that the groove portion 15a is at slightly less than 360°. It will be also noted that the lead angle of the groove portion 15a may vary in a wave form reversely symmetrically relative to the neutral position of the steering wheel. Instead of the embodiment shown, the guide groove 15 may be provided in the housing 2 while the pin 16 may be mounted on the outer periphery of the variable sleeve 12.

The operation of the steering gear of the invention will be described hereinafter. When the steering wheel is in the neutral position, the variable sleeve 12 is engaged with the first and second pinion portions 7 and 7' at the same distance as shown in FIG. 1, and therefore, the pin 16 is positioned at the middle of the groove portion 15a having the lead angle of 0°. When the steering wheel is turned in a right-hand direction from this position of the pin 16 to rotate the first pinion portion 7, the variable sleeve 12 is also rotated in the same direction. Since the pin 16 is engaged with the groove portion 15a in the variable sleeve 12 until the steering wheel rotates the initial angle of 180°, the variable sleeve 12 never spirally rotates. Thus, the variable sleeve serves as an involute spiral serration type coupling by means of its internal gears 14 and 14'. As a result, the rotation of the first pinion portion 7 is transferred directly to the second pinion portion 7' so that the rack is moved in the forward direction along the vertical axis thereof as seen from FIG. 1. Thus, the tie rod is moved in the right turning direction.

When the first pinion portion 7 continues to be rotated until the pin 16 reaches a portion of the guide groove having the lead angle $\beta$, the variable sleeve 12 is spirally rotated by the lead angle $\beta$ of the guide groove 15 so as to axially move by the distance l in the direction indicated at an arrow a of FIG. 2. Supposing that the lead angle of the spiral teeth of the pinion portions 7 and 7' is $\alpha$, the turning angle of the steering wheel is $\theta$, the radius of the pitch of the guide groove 15 is r, and the radius of the pitch of the pinion portions 7 and 7' is R, then the distance l is given as follows;

$$l = (\theta/360°)2\pi r \cdot \tan \beta$$

since the movement of the variable sleeve in the direction of the arrow a is made in accordance with the lead angle $\alpha$ of the pinion portion 7, the variable sleeve 12 is rotated in the direction reverse to that of the first pinion portion 7 by means of the internal gear 14 at the following distance l;

$$l \cdot \tan \theta = (\frac{\theta}{360°} 2\pi r \cdot \tan \beta) \tan \alpha$$

Meanwhile, turning effect is never transmitted to the second pinion portion 7' because of the spiral motion of the variable sleeve 12 (see FIG. 3). As noted from the afore-mentioned description, while the variable sleeve 12 is not spirally (axially) moved, the movement $L_0$ of the rack 5 is given as follows:

$$L_0 = \frac{\theta}{360°} \cdot 2\pi R$$

On the other hand, in case the variable sleeve 12 is spirally moved to be axially moved by the distance l, the movement $L_1$ of the rack 5 is given as follows;

$$L_1 = L_0 - 2l\tan \alpha$$
$$= \frac{\theta}{360°} 2\pi R - 2 (2\pi r \frac{\theta}{360°} \tan \beta \tan \alpha)$$
$$= \frac{\theta}{360°} 2\pi (R - 2r \tan \beta \tan \alpha)$$

Thus, after the spiral portion of the guide groove 15 in the variable sleeve 12 reaches the pin 16, the movement $L_1$ of the rack 5 varies with variation of the turning angle $\theta$ of the steering wheel, and therefore, the steering ratio also varies.

When actually designing the gear, severe conditions and accurate calculations are required in accordance with its performance, but in order to facilitate understanding of its concept on specific values, an approximate calculation will be made hereinafter.

Supposing that $\alpha$ is 30°, R is 6 mm, r is 26 mm, and supposing that after one revolution of the steering wheel in the right-hand direction, the steering ratio is intended to be reduced by 40 percent, then the movement $L_0$ of the rack until half revolution of the steering wheel is as follows;

$$L_0 = \pi R = 6\pi \text{ mm}$$

and thereafter the movement $L_1$ of the rack is as follows;

$$L_1 = 2l\tan \alpha = 0.4 \times 6\pi$$

Thus, $$l = \frac{0.4 \times 6\pi}{2 \tan \alpha} \approx 6.53 \text{ mm}$$

and therefore, $$\tan \beta = \frac{l}{\pi r} = \frac{6.53}{\pi \cdot 26} \approx 0.078$$

with the result that $\beta$ is 4°30'.

FIG. 4 illustrates the developed guide groove 15 of the sleeve spiral motion means, the turning angle of the steering wheel and the overall steering ratio. In this figure, the curves a and b indicate the developed guide grooves 15, one of which includes the groove portion 15a having the lead angle of 0°, and the other of which includes the groove portion 15a having the lead angle varying in a wave form, respectively. In case of the curve a, the gear 1 is suitable for improvement on straight driving of the automobile which is based on the lower overall steering ratio when the automobile runs straight, and also for a light steering input or steering power which is based on the higher steering ratio when the automobile is put into a garage. On the other hand, in case of the curve b, the gear 1 is suitable for light steering power when the automobile is taken out of the garage after not being used for a long time, and also when it is put into the garage. In FIG. 4, curves a' and b' illustrate the overall steering ratios in case the guide grooves 15 have the configurations of the curves a and b, respectively. It will be noted that these ratios vary in accordance with the turning angle of the steering wheel. In FIG. 4, a curve c illustrates a constant steering ratio, but it will be also noted that in this case the steering ratio slightly varies throughout the course of operation of the steerig wheel, because of the effect of the circular motion of the steering wheel.

FIG. 5 shows another embodiment of the invention, which is substantially identical to the embodiment of FIG. 1, except that the second pinion portion 7' may be connected to the variable sleeve 12 by physically connecting the variable sleeve directly with the second pinion portion 7', rather than by the internal gear 14' on the variable sleeve 12 as in the aforementioned embodiment. In this embodiment, when the variable sleeve 12 is spirally moved, the second pinion portion 7' moves across the rack 5, but the other operation is substantially identical to that of the aforementioned embodiment.

While some preferred embodiments of the invention have been illustrated and described with reference to the accompanying drawings, it will be understood by those skilled in the art that they are by way of example, and that various modifications and changes may be made without departing from the spirit and scope of the invention, which is intended to be defined only by the appended claims.

I claim:

1. A rack and pinion type steering gear for an automobile comprising a housing; a pinion rotatably supported in said housing to receive turning effect from a steering wheel of said automobile; and a rack meshed with said pinion and slidably supported in said housing, said rack being adapted to be connected to a tie rod which is in turn connected to wheels of said automobile, said steering gear characterized in that said pinion comprises first and second pinion portions rotatable separately from each other and having spiral gear teeth reversely provided to each other, respectively, said first pinion portion being adapted to be connected to said steering wheel and said second pinion portion being meshed with said rack, and further comprising variable steering ratio means including a variable steering ratio sleeve rotatably and axially slidably supported in said housing, having a spiral internal gear meshed with said first pinion portion and being connected to said second pinion portion so as to transmit said turning effect to said second pinion portion; and variable sleeve spiral motion means provided between the engaging surfaces of said housing and said variable sleeve and having a guide groove of variable lead angle and a pin engaged with said guide groove.

2. A rack and pinion type steering gear as set forth in claim 1, and said variable steering ratio sleeve having a spiral internal gear meshed with said second pinion portion whereby said variable steering ratio sleeve is connected to said second pinion portion.

3. A rack and pinion type steering gear as set forth in claim 1, said variable steering ratio sleeve being physically connected directly to said second pinion portion.

4. A rack and pinion type steering gear as set forth in claim 1, said spiral groove of said variable sleeve spiral motion means being provided in the outer periphery of said variable sleeve while said pin is mounted on said housing at its inner periphery.

5. A rack and pinion type steering gear as set forth in claim 1, and said guide groove of said variable sleeve spiral motion means being provided in the inner periphery of said housing while said pin is mounted on the outer periphery of said variable sleeve.

6. A rack and pinion type steering gear as set forth in claim 1, and wherein said variable lead angle of said guide groove is zero at the neutral position of said steering wheel and near the turning position of said steering wheel from said neutral position at a slight angle in both directions.

7. A rack and pinion type steering gear as set forth in claim 1, and wherein said variable lead angle of said guide groove slightly varies in a wave form at the neutral position of said steering wheel and near the turning position of said steering wheel from said neutral position in both directions.

* * * * *